(12) United States Patent
Zhang et al.

(10) Patent No.: US 9,845,372 B2
(45) Date of Patent: Dec. 19, 2017

(54) TRIBOELECTRICALLY NEUTRAL POLYMER

(71) Applicant: National University of Singapore, Singapore (SG)

(72) Inventors: Xuan Zhang, Singapore (SG); Siow Ling Soh, Singapore (SG)

(73) Assignee: National University of Singapore (SG)

( * ) Notice: Subject to any disclaimer, the term of this patent is extended or adjusted under 35 U.S.C. 154(b) by 0 days.

(21) Appl. No.: 15/176,572

(22) Filed: Jun. 8, 2016

(65) Prior Publication Data

US 2016/0355675 A1    Dec. 8, 2016

Related U.S. Application Data

(60) Provisional application No. 62/230,507, filed on Jun. 8, 2015.

(51) Int. Cl.

| | | |
|---|---|---|
| C08F 216/08 | (2006.01) |
| C08F 222/10 | (2006.01) |
| C08F 218/08 | (2006.01) |
| C08F 220/24 | (2006.01) |
| C08F 220/44 | (2006.01) |
| C08L 33/12 | (2006.01) |
| C08L 35/04 | (2006.01) |
| C08L 77/00 | (2006.01) |

(52) U.S. Cl.
CPC ...... *C08F 222/1006* (2013.01); *C08F 218/08* (2013.01); *C08F 220/24* (2013.01); *C08F 220/44* (2013.01); *C08L 33/12* (2013.01); *C08L 35/04* (2013.01); *C08L 77/00* (2013.01); *C08F 2222/1013* (2013.01)

(58) Field of Classification Search
CPC .......... C08F 222/1006; C08F 218/08; C08F 220/24; C08F 220/44; C08F 2222/1013; C08L 33/12; C08L 35/04; C08L 77/00
See application file for complete search history.

(56) References Cited

U.S. PATENT DOCUMENTS

2012/0118490 A1\* 5/2012 Dolsey ............... B41M 5/0256
156/230

\* cited by examiner

*Primary Examiner* — Nathan M Nutter
(74) *Attorney, Agent, or Firm* — Harness, Dickey & Pierce, P.L.C.

(57) ABSTRACT

A triboelectrically neutral polymer material which resists charging when contacted with another material is provided. The polymer material comprises at least a first polymer and a second polymer, the first polymer having a first rating on a triboelectric series and the second polymer having a second rating on a triboelectric series that is more negative than the first rating. A method of preparing the polymer material is also provided.

20 Claims, 11 Drawing Sheets

Figure 1

| | |
|---|---|
| + More positive | Glass |
| | Mica |
| | Polyamide(Nylon6,6) |
| | Rock salt(NaCl) |
| | Wool |
| | Fur |
| | Silica |
| | Silk |
| | Aluminum |
| | Poly(vinyl alcohol)(PVA) |
| | Poly(vinyl acetate)(PVAc) |
| | Paper |
| | Cotton |
| | Steel |
| | Wood |
| | Amber |
| | Poly(methyl methacrylate)(PMMA) |
| | Copper |
| | Silver |
| | Gold |
| | Poly(ethylene terephthalate)(Mylar) |
| | Epoxy resin |
| | Natural rubber |
| | Polyacrylonitrile(PAN) |
| | Poly(bisphenol A carbonate)(Lexan, PC) |
| | Poly(vinylidene chloride)(Saran) |
| | Polystyrene(PS) |
| | Polyethylene(PE) |
| | Polypropylene(PP) |
| More negative − | Poly(vinyl chloride)(PVC) |
| | Polytetrafluoroethylene(teflon,PTFE) |

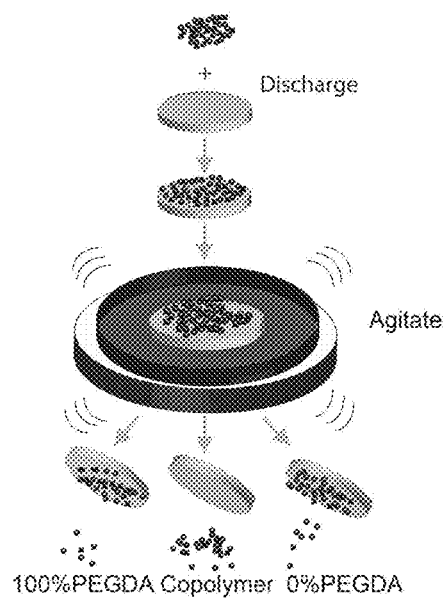

Figure 9A
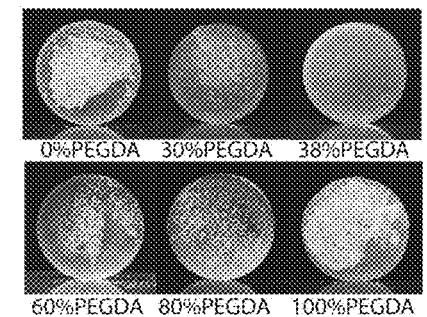
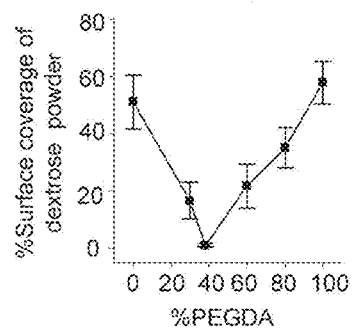
Figure 9B
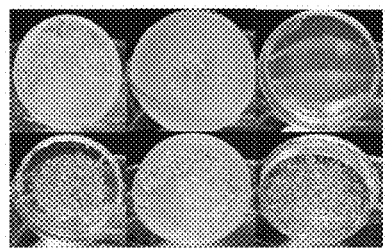
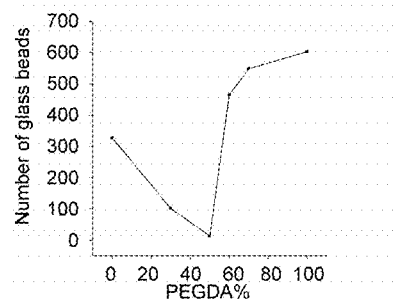

TRIBOELECTRICALLY NEUTRAL POLYMER

This application claims the benefit of U.S. provisional application Ser. No. 62/230,507 filed Jun. 8, 2015, the entire contents of which are herein incorporated by reference.

TECHNICAL FIELD

The present invention relates to a polymer which is triboelectrically neutral and a method of making the same.

BACKGROUND

Contact electrification is a phenomenon in which surfaces become charged when they are brought into contact and are then separated. While this is required in some applications, many a times it poses to be an undesirable effect. For example, charge accumulated on solid surfaces by contact electrification can cause slight annoyances in many everyday activities, such as the sticking of clothes onto each other while drying, the experience of a shock when one touches a doorknob in dry weather, and the adhesion of dust particles on surfaces (e.g., on screens of computers due to attractive electrostatic force). More importantly, electrical discharges (e.g., sparks) due to the accumulated charge may potentially result in dangerous situations such as the explosion of flammable gases, dusts, and organic liquids (e.g., during the fueling of vehicles). Electrical discharges are also responsible for the damage of equipment; these damages are reported to cost the electronic industry billions of dollars per year. In many other types of industries, the accumulation of charge on solid surfaces also can make processes less efficient. For example, charged particles that adhere onto the walls of reactor vessels can hinder effective heat transfer; charged powder in the pharmaceutical industry can lead to non-uniform blending, thus resulting in non-uniform dosages of the products. Therefore, it is important to eliminate charge on solid surfaces due to contact electrification.

Polymers are especially problematic: they have the natural tendency to charge highly on contact, and are typically insulating. The approach to eliminate static charge involves making the polymers conductive in order to dissipate charge away from their surfaces. Methods include fabricating polymeric composite materials (with a conductive material), doping (e.g., doped conjugated polymers), or adding antistatic agents. A wide variety of antistatic agents has been developed, such as powdered metals, carbon nanotubes, and graphene. In general, these methods have their disadvantages and limitations. For example, modifying the materials (e.g., through doping or adding antistatic agents) may change their properties in unfavourable ways such as by reducing their mechanical strength, or changing their colour. They may also become incompatible with certain applications; for example, the materials may become corrosive, toxic, or instable to heat. In order to preserve the properties of the materials, one approach is to coat their surfaces with a layer of conductive film. Other methods include coating surfaces with charged molecules (e.g., self-assembled monolayer of ionic molecules, and multilayers of polyelectrolytes).

Such chemical modification and coatings of the surface, however, are susceptible to degradation through wear and tear, and may require additional considerations. For example, if a certain region has worn off to a certain extent such that a region becomes electrically insulated from ground, the whole region loses its ability to conduct charge away.

There is therefore a need for an improved material.

SUMMARY OF THE INVENTION

The present invention seeks to address these problems, and/or to provide an improved material which is resistant to charging.

In general terms, the invention relates to a polymeric material that can resist charging with another reference material and resists charging at every localized point on its surface. The invention also relates to a method of preparing such a material. The material may be continuous and homogeneous or a composite material.

According to a first aspect, the present invention provides a polymer material comprising at least a first polymer or a first monomer of the first polymer and a second polymer a second monomer of the second polymer, wherein the first polymer has a first rating on a triboelectric series and the second polymer has a second rating on a triboelectric series that is more negative than the first rating, and wherein the polymer material is triboelectrically neutral such that it resists charging when contacted with another material.

According to a particular aspect, the polymer material may be a copolymer. Even more in particular, the polymer material may be homogeneous.

According to another particular aspect, the polymer material may be a composite material of at least the first polymer and the second polymer.

The first polymer and the second polymer may be non-conductive or insulating polymers. For example, the first polymer and the second polymer may be any suitable non-conductive polymers. According to a particular aspect, the first monomer may be polyethylene glycol diacrylate (PEGDA) or the first polymer may be, but not limited to, polymerized polyethylene glycol diacrylate (PEGDA), polyvinyl acetate (PVAc), polyamide, polymethyl methacrylate, and the like. In particular, the first polymer may be polymerized PEGDA.

According to a particular aspect, the second monomer may be 3,3,4,4,5,5,6,6,7,7,8,8,9,9,10,10,10-Heptadecafluorodecyl methacrylate (HDFDMA) or the second polymer may be, but not limited to polymerized 3,3,3,4,4,5,5,6,6,7,7,8,8,9,9,10,10,10-Heptadecafluorodecyl methacrylate (HDFDMA), polyacrylonitrile (PAN), polyethylene, polyvinyl chloride and the like. In particular, the second polymer may be polymerized HDFDMA.

According to a particular aspect, the first polymer may be polymerized polyethylene glycol diacrylate (PEGDA) and the second polymer may be polymerized 3,3,4,4,5,5,6,6,7,7,8,8,9,9,10,10,10-Heptadecafluorodecyl methacrylate (HDFDMA). In particular, the polymer material may comprise 50% polymerized PEGDA and 50% polymerized HDFDMA by weight of total weight of the polymer material.

According to a second aspect, the present invention provides a method of preparing a polymer material comprising the steps of mixing at least a first pre-determined amount of a first polymer or a first monomer of the first polymer and a second pre-determined amount of a second polymer or a second monomer of the second polymer, the first polymer having a first rating on a triboelectric series and the second polymer having a second rating on a triboelectric series that is more negative than the first rating, wherein the first pre-determined amount and the second pre-determined amount are such that the polymer material resists charging when contacted with another material.

According to a particular aspect, the mixing may comprise copolymerizing the first monomer of the first polymer and the second monomer of the second polymer. The polymer material prepared by the method may be a copolymer. In particular, the polymer material prepared by the method may be homogeneous.

According to another particular aspect, the mixing may comprise physically mixing at least the first polymer and the second polymer. The polymer material prepared by the method may be a composite material of at least the first polymer and the second polymer.

The first polymer and the second polymer may be non-conductive or insulating polymers. In particular, the first polymer and the second polymer may be as described above in relation to the first aspect.

The third aspect of the present invention provides a method of preparing a copolymer comprising the steps of co-polymerizing at least a first pre-determined amount of a first monomer of a first polymer and a second pre-determined amount of a second monomer of a second polymer, the first polymer having a first rating on a triboelectric series and the second polymer having a second rating on a triboelectric series that is more negative than the first rating, wherein the first pre-determined amount and the second pre-determined amount are such that the copolymer resists charging when contacted with a material. The copolymer prepared by the method may be homogeneous.

The first polymer and the second polymer may be non-conductive or insulating polymers. In particular, the first polymer and the second polymer may be as described above in relation to the first aspect.

The co-polymerizing may be by any suitable polymerization method. According to a particular aspect, the co-polymerizing may be by free-radical polymerization.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings:

FIG. 1 shows the triboelectric series;

FIG. 2A shows contact electrification of a copolymer according to one aspect of the present invention. FIG. 2B shows contact electrification of a composite polymer material according to another aspect of the present invention;

FIG. 3A shows charge of copolymers with a reference material of PVC (FIG. 3A). FIG. 3B shows charge of copolymers with a reference material of glass (FIG. 3B);

FIG. 4A shows a charge density of the 100% PEGDA polymer, 50%-50 wt % PEGDA-HDFDMA copolymer, and 100% HDFDMA polymer after contacting with reference materials. FIG. 4B shows a charge density of the reference materials after contact with the 100% PEGDA polymer, 50%-50 wt % PEGDA-HDFDMA copolymer, and 100% HDFDMA polymer;

FIG. 5A shows charge density of copolymers when contacted with PVC. FIG. 5B shows charge density of copolymers when contacted with glass;

FIG. 8 shows a scheme illustrating the procedure of testing the charging strength of a material;

FIGS. 9A-9B show the side views of surfaces of different polymeric compositions. FIG. 9A shows the side views of surfaces of different polymeric compositions adhering to different amounts of powder after agitation and a plot of the surface coverage of the powder that adhered onto the surface of different compositions. FIG. 9B shows the side views of surfaces of different polymeric compositions (from left to right: 100% PEGDA, 50% PEGDA, 0% PEGDA) adhering to different amounts of glass beads after agitation and a plot of the surface coverage of the glass beads that adhered onto the surface of different compositions;

FIG. 10A is an image of 100% PEGDA. FIG. 10B is an image of 0% PEGDA. FIG. 10C is an image of 40% PEGDA;

FIG. 11A shows charge density of different compositions of PVAc-PAN copolymers after contacting with reference material ABS. FIG. 11B shows charge density of ABS after contact with the copolymer;

FIG. 13A is charge density for a material comprising PTFE particles dispersed in a PA matrix. FIG. 13B shows charge of a reference material, PVC, as the amount of PTFE particles in the PA matrix varies. FIG. 13C shows is charge density for a material comprising PTFE particles dispersed in a PEGDA matrix. FIG. 13D shows charge of a reference material, PVC, as the amount of PTFE particles in the PEDGA matrix varies.

DETAILED DESCRIPTION

Figure 2A:
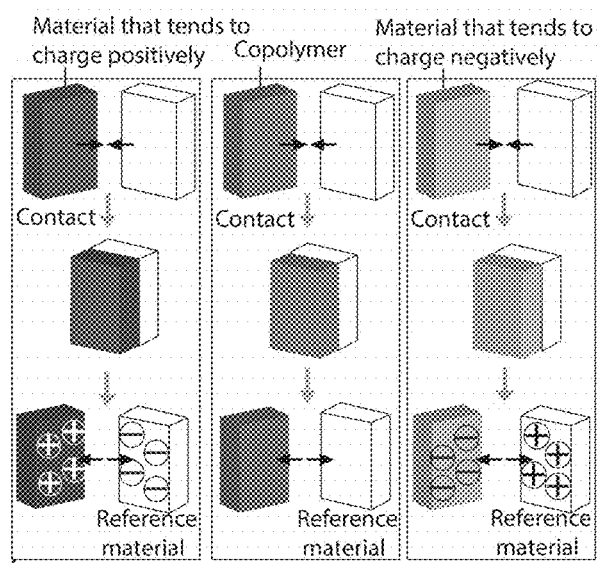
FIGS. 2A-2B show schemes of contact electrification on different materials.

The present invention provides a non-charging polymeric material as the material resists charging. The material may be a continuous and homogeneous material that can resist charging with another reference material. Because the material is continuous, the material may be less prone to wear and tear as compared to traditional coatings used as antistatic agents. Alternatively, the material may be a composite material.

Further, the material does not rely on conducting charge away, but rather resists charging at every localized point on its surface. In this way, isolation with a ground may be avoided.

The polymer material may comprise at least two polymers: one which has a tendency to charge positively with most materials and another which has a tendency to charge negatively with most materials. In particular, the amount of the polymer which has a tendency to charge positively and the amount of the polymer which has a tendency to charge negatively may be varied, depending on the reference material the polymer material is to be used with to resist charging against that reference material. In particular, the polymer material may be a copolymer.

According to a first aspect, there is provided a polymer material comprising at least a first polymer or a first monomer of the first polymer and a second polymer or a second monomer of the second polymer, wherein the first polymer has a first rating on a triboelectric series and the second polymer has a second rating on the triboelectric series that is more negative than the first rating, and wherein the polymer material is triboelectrically neutral such that it resists charging when contacted with another material. In particular, the polymer material resists charging due to contact electrification.

The triboelectric series is an empirically determined list of materials ranked according to their tendency to charge upon contact with other materials. A triboelectric series is shown in FIG. 1. In general, a material has the tendency to charge positively against another material ranked lower than it, and vice versa. Therefore, a material ranked close to the top of the series has a tendency to charge positively against many other materials, and a material ranked close to the bottom of the series has a tendency to charge negatively against many other materials.

The first polymer and the second polymer may be any suitable polymers for the purposes of the present invention. The first polymer and the second polymer may be selected based on their respective rating within the triboelectric series. In particular, the first polymer has a tendency to charge positively and the second polymer has a tendency to charge negatively. In particular, the first polymer and the second polymer may be close in the triboelectric series (after polymerization), as long as the material the polymer material is contacted with is between the first polymer and the second polymer.

The first polymer or a first monomer and the second polymer or a second monomer may be in any suitable form. In particular, the first polymer or the first monomer of the first polymer and the second polymer or the second monomer of the second polymer may be in liquid form or in the form of solid particles.

The first polymer and the second polymer may be non-conductive or insulating polymers. Accordingly, the polymer material does not rely on increasing conductivity of the material it is contacted with. The polymer material also does not require further modification such as the addition of antistatic agents or dopants.

According to a particular aspect, the polymer material may be a copolymer of at least the first monomer and the second monomer. In particular, the polymer material may be homogeneous. For the purposes of the present invention, a homogeneous material is defined as a structurally homogeneous material whose composition is same throughout the bulk material. In particular, the copolymer is not a composite material and therefore may not have mismatch between properties of different components within the single material.

FIG. 2A shows the charges on a surface of different polymers following contact electrification. In particular, the scheme shown on the left of FIG. 2A shows a polymer that has a tendency to charge positively after contact electrification, while the scheme shown on the right shows a polymer that tends to charge negatively. The effect of contact electrification of a copolymer according to the present invention is shown in the middle scheme of FIG. 2A—the copolymer resists charging against the reference material.

Figure 2B:
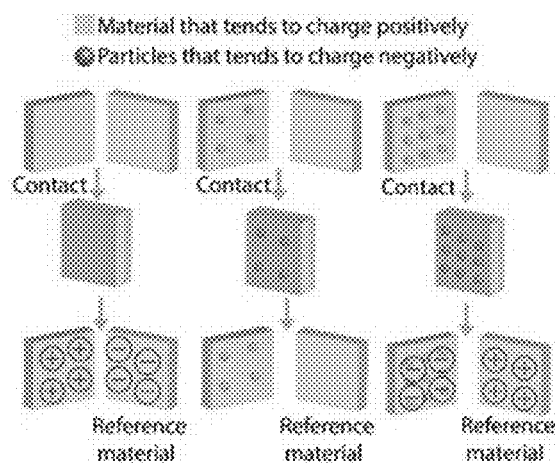

According to another particular aspect, the polymer material may be a composite of at least the first polymer and the second polymer. FIG. 2B shows the charges on a surface of different polymers following contact electrification. In particular, the scheme shown on the left of FIG. 2B shows a polymer material that has a tendency to charge positively after contact electrification with a reference material, while the scheme shown on the right shows a composite polymer material that tends to charge negatively following contact electrification with a reference material. The effect of contact electrification of a polymer material which is a composite according to the present invention comprising an appropriate portion of the first polymer and the second polymer is shown in the middle scheme of FIG. 2B—the composite resists charging against the reference material.

According to a particular aspect, the first monomer comprises polyethylene glycol diacrylate (PEGDA) or the first polymer may be, but not limited to, polymerized polyethylene glycol diacrylate (PEGDA), polyvinyl acetate (PVAc), polyamide, polymethyl methacrylate, and the like. In particular, the first polymer may be polymerized PEGDA. The polymerized PEGDA may have an appropriate average molecular weight. For example, the number average molecular weight ($M_n$) may be about 500-1000. In particular, the $M_n$ of PEGDA may be 525-975, 550-950, 575-925, 600-900, 625-875, 650-850, 675-825, 700-800, 725-875, 750-850, 775-825, 780-800. Even more in particular, the $M_n$ of PEGDA may be 700. In particular, the oxygen atoms in the polyethylene glycol linker of the PEGDA might serve as the Lewis basic sites for binding cations present on any contacting surfaces. Transfer of these cations to the surface of PEGDA would charge PEGDA positively.

According to a particular aspect, the second monomer comprises 3,3,4,4,5,5,6,6,7,7,8,8,9,9,10,10,10-Heptadecafluorodecyl methacrylate (HDFDMA) or the second polymer may be, but not limited to, polymerized 3,3,4,4,5,5,6,6,7,7,8,8,9,9,10,10,10-Heptadecafluorodecyl methacrylate (HDFDMA), polyacrylonitrile (PAN), polyethylene, polyvinyl chloride, and the like. In particular, the second polymer may be polymerized HDFDMA. The HDFDMA contains many fluorine atoms and therefore, HDFDMA when polymerised may share similar contact-charging characteristics with poly(tetrafluoroethylene) (PTFE), a polymer that contains a high number of fluorine atoms. PTFE ranks at the bottom of the triboelectric series shown in FIG. 1.

According to a particular aspect, the first monomer comprises polyethylene glycol diacrylate (PEGDA) or the first polymer may be polymerized polyethylene glycol diacrylate (PEGDA) and the second monomer comprises 3,3,4,4,5,5,6,6,7,7,8,8,9,9,10,10,10-Heptadecafluorodecyl methacrylate (HDFDMA) or the second polymer may be polymerized 3,3,4,4,5,5,6,6,7,7,8,8,9,9,10,10,10-Heptadecafluorodecyl methacrylate (HDFDMA). It would be clear to a skilled person that other combinations of the first polymer and the second polymer may be possible.

The polymer material may comprise an appropriate proportion of the first polymer and the second polymer such that the polymer material resists charging against another material. The proportion of the first polymer or first monomer and the second polymer or second monomer comprised in the polymer material may vary depending on the reference material the polymer material is to be used with, as well as the specific first polymer and second polymer used. For example, the proportion of the first polymer or first monomer in the polymer material may be between 0% and 100%. In particular, the proportion of the first polymer or first monomer may be 10%-90%. The proportion of the first polymer or first monomer in the polymer material may be 15-85%, 18-80%, 20-75%, 25-70%, 30-68%, 35-65%, 40-60%, 42-58%, 44-55%, 45-52%, 48-50%. In particular, the proportion of the first polymer or first monomer may be 50%. Even more in particular, the polymer material may comprise 50% polymerized PEGDA and 50% polymerized HDFDMA. The percentages represent the amount of first polymer or first monomer added by weight in the pre-polymer solution mixture in the preparation of the polymer material based on the total weight of the pre-polymer solution. Results from elemental analysis of the polymer material prepared shows that the compositions of the polymer material prepared is similar to the composition of the pre-polymer mixtures used in preparing the polymer material.

Figure 3A:
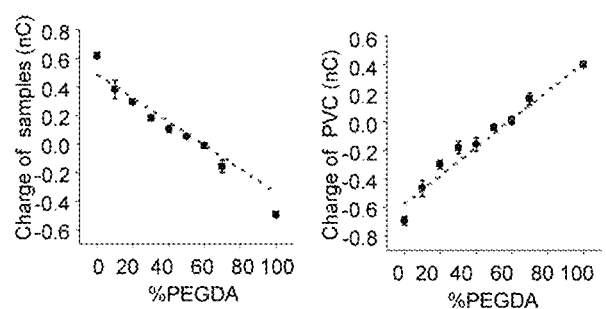
FIGS. 3A-3B are plots showing the charge of copolymers according to particular embodiments.
Figure 3B:
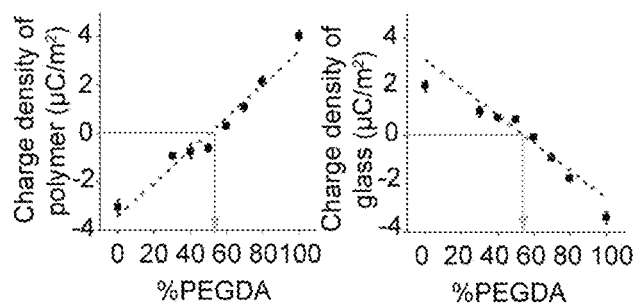

The appropriate proportion against a specific reference material may be found by contacting the polymer material with different proportions of the first polymer or first monomer and the second polymer or second monomer against the reference material. The charges may be measured and plotted to determine at which concentration both the reference material and the polymer material will not charge following contact electrification. For example, this was carried out for a copolymer comprising PEGDA as the first monomer and HDFDMA as the second monomer and the reference material being polyvinyl chloride (PVC). It was found that a copolymer comprising about 40% PEGDA monomer and 60% HDFDMA monomer will not charge against the PVC following contact electrification. This is shown in FIG. 3A. FIG. 3A also shows that the PVC does not charge when contacted with the copolymer comprising about 40% PEGDA monomer. This was repeated with glass as the reference material and the results are shown in FIG. 3B. It was found that a copolymer comprising about 55% PEGDA monomer and 45% HDFDMA monomer will not charge against the PVC following contact electrification.

The polymer material may be non-conductive or insulating. In particular, the polymer material need not be provided with a conductive surface to ground charges as the polymer material is non-conductive when it is formed. Even after contact electrification with another material, the polymer material remains non-conductive. Accordingly, the problem of electrical isolation will be avoided for the polymer material of the present invention.

According to another particular aspect, the polymer material may be triboelectrically neutral across all its surfaces and points. In this way, any part of the polymer material will be able to resist charge when brought into contact with another material.

The second aspect of the present invention provides a method of preparing a polymer material comprising the steps of mixing at least a first pre-determined amount of a first polymer or a first monomer of the first polymer and a second pre-determined amount of a second polymer or a second monomer of the second polymer, the first polymer having a first rating on a triboelectric series and the second polymer having a second rating on a triboelectric series that is more negative than the first rating, wherein the first pre-determined amount and the second pre-determined amount are such that the polymer material resists charging when contacted with a reference material.

According to a particular aspect, the mixing may comprise co-polymerizing at least the first monomer of the first polymer and the second monomer of the second polymer. The polymer material prepared by the method may be a copolymer of the at least first monomer and the second monomer. In particular, the copolymer may be homogeneous, as described above.

The first monomer and the second monomer may be as described above in relation to the first aspect. According to a particular aspect, the first monomer and the second monomer may be mixed to form a liquid mixture prior to the co-polymerizing.

The co-polymerizing may be by any suitable polymerization method. For example, the co-polymerizing may be by free-radical polymerization, condensation polymerization, plasma polymerization, ring-opening polymerization, and the like.

According to a particular aspect, the co-polymerizing may be by free-radical polymerization. This involves a method of polymerizing by which the copolymer is formed by the successive addition of free radical building blocks of the first monomer and the second monomer.

The free-radical polymerization may be carried out under suitable conditions. For example, the co-polymerizing of the first monomer and the second monomer may be carried out in the presence of a radical initiator. The co-polymerizing may be in the presence of a suitable source, such as but not limited to, a UV source, visible light, heat, or a combination thereof.

According to another particular aspect, the mixing may comprise physically mixing at least the first polymer and the second polymer. The polymer material prepared by the method may be a composite polymer comprising at least the first polymer and the second polymer as described above.

The first pre-determined amount and the second pre-determined amount may depend on the amount of the first polymer or the first monomer and the second polymer or the second monomer required to form a polymer material which resists charging against another material. The first pre-determined amount and the second pre-determined amount may vary depending on the reference material the polymer material prepared is to be used with, as well as the specific first polymer or first monomer and second polymer or second monomer used. For example, the first pre-determined amount may be between 0% and 100%. In particular, the proportion of the first polymer or first monomer may be from 10%-90%. The first pre-determined amount may be 15-85%, 18-80%, 20-75%, 25-70%, 30-68%, 35-65%, 40-60%, 42-58%, 44-55%, 45-52%, 48-50%. In particular, the first pre-determined amount may be 50%. Even more in particular, the first pre-determined amount may be 50% and the first polymer or first monomer may be PEGDA, and the second pre-determined amount may be 50% and the second polymer or second monomer may be HDFDMA. The percentages represent the amount of polymer added in a pre-polymer solution mixture in the method of preparation of the polymer material prior to the mixing.

Figure 12:
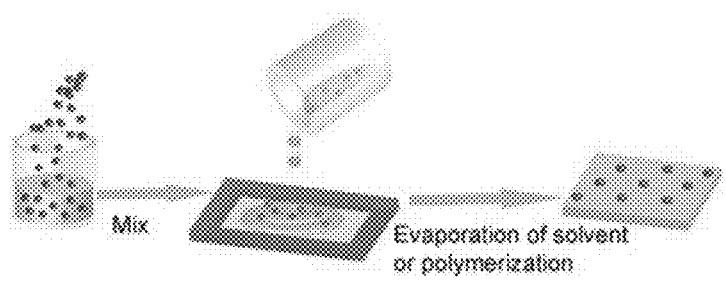
FIG. 12 shows the general scheme for preparing composite polymer material according to one embodiment of the present invention.

In particular, the general scheme of preparing the composite polymer material may be as shown in FIG. 12. For example, the first polymer may be in the form of particles and the second polymer may be in liquid form. The particles of the first polymer may be mixed with the liquid second polymer. The mixture may then be solidified by either polymerizing the liquid polymer or by evaporating the solvent in which the second polymer was dissolved.

An appropriate first pre-determined amount and the second pre-determined amount may be found by contacting a polymer material with different first pre-determined amounts of the first polymer and second pre-determined amounts of the second polymer against a reference material. The charges following the contact electrification may be measured and plotted to determine at which first pre-determined amount and second pre-determined amount both the reference material and the polymer material will not charge following contact electrification.

The method of the present invention does not require any additional steps following the mixing to form the polymer material which resists charging. The elimination of such additional steps, such as doping, therefore avoids the problem of weakening of the polymer material's properties.

According to a particular aspect, there is provided a method of preparing a copolymer comprising the steps of co-polymerizing a first pre-determined amount of a first monomer of a first polymer and a second pre-determined amount of a second monomer of a second polymer, the first polymer having a first rating on a triboelectric series and the second polymer having a second rating on a triboelectric series that is more negative than the first rating, wherein the first pre-determined amount and the second pre-determined amount are such that the copolymer resists charging when contacted with a material. The copolymer prepared by the method may be a homogeneous material, as described above.

Whilst the foregoing description has described exemplary embodiments, it will be understood by those skilled in the technology concerned that many variations may be made without departing from the present invention.

Having now generally described the invention, the same will be more readily understood through reference to the following examples which are provided by way of illustration, and are not intended to be limiting.

EXAMPLE

Example 1

Materials 3,3,4,4,5,5,6,6,7,7,8,8,9,9,10,10,10-heptadecafluorodecyl methacrylate (HDFDMA), poly(ethylene glycol) diacrylate (PEGDA; average molecular weight 575), 1-hydroxycyclohexyl phenyl ketone, acrylonitrile, vinyl acetate, ammonium persulfate (APS), nitric acid ($HNO_3$), and dextrose powder (106-150 μm) were purchased from Sigma-Aldrich. Tetrahydrofuran (THF; analytical grade) and ethanol were purchased from Fisher Chemical. Acrylonitrile butadiene styrene (ABS) was purchased from Tiertime. Glass was purchased from Continental Lab Products CLP. Silica was purchased from Latech Scientific Supply Pte. Ltd. Polyvinyl chloride (PVC), poly(methyl methacrylate) (PMMA), polycarbonate (PC) and nylon were purchased from DT Hardware Supplier.

Fabrication and Characterization of PEGDA

100% PEGDA polymer was fabricated by free-radical polymerization. In particular, a photoinitiator (1-hydroxycyclohexyl phenyl ketone) (0.01 g, 0.049 mmol) was placed into a vial. Subsequently, PEGDA (1 g, 1.7 mmol) was added to the vial. This mixture was mixed, and was then transferred to a glass bottle (54.8 mm in height, and 27 mm in diameter) where it was exposed to UV light (intensity of 0.55 mW/cm$^2$ at a wavelength of 365 nm) for 30 minutes.

Figure 4A:
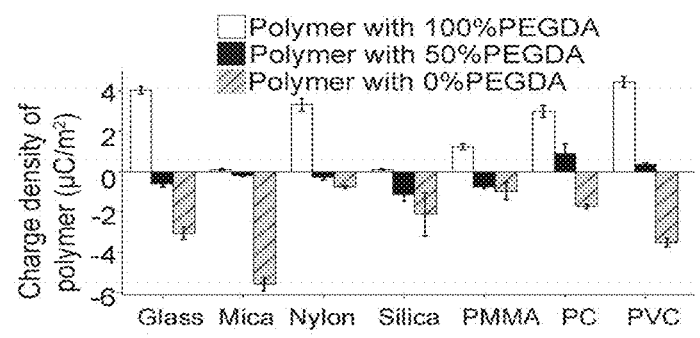
FIGS. 4A-4B are plots showing the charge density (i.e. charge per unit surface area of contact).
Figure 4B:
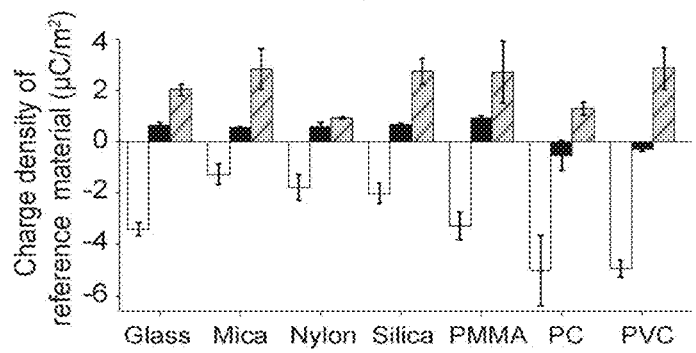

The PEGDA polymer prepared was then contacted with other materials. The polymerized PEGDA and a reference material were first discharged using a Zerostat gun. After discharging the materials, the polymerized PEGDA was contacted with the reference material for about 20 times. The charges of both materials were measured by a Faraday Cup connected to an electrometer (Keithley, model 6514). This was repeated for different types of reference materials as shown in the x-axes of FIGS. 4A and 4B. The polymerized PEGDA charged positively against all the reference materials tested as shown in FIG. 4A, while the reference materials charged negatively (FIG. 4B). Importantly, the polymerized PEGDA was found to charge positively against materials (i.e., nylon, mica, and glass) that are ranked around the top of the triboelectric series shown in FIG. 1. Therefore, PEGDA is expected to charge positively against a wide variety of materials.

Characterization of HDFDMA

Similarly to PEGDA, polymerized HDFDMA was also formed and tested against reference materials (i.e. 0% PEGDA). It was found that HDFDMA charged negatively against all other reference materials (FIG. 4A), while the other reference materials were found to charge positively (FIG. 4B). Because HDFDMA charged positively against PTFE, PTFE was not used as the reference material.

Fabrication and Characterization of Copolymer Comprising PEGDA and HDFDMA

After verifying that PEGDA has the tendency to charge positively and HDFDMA has the tendency to charge negatively against many materials, a mixture of PEGDA (50%) and HDFDMA (50%) was co-polymerized by free radical polymerization. In particular, a photoinitiator (1-hydroxycyclohexyl phenyl ketone) (0.01 g, 0.049 mmol) was placed into a vial. Subsequently, PEGDA (1 g, 1.7 mmol), HDFDMA and the solvent, THF (1.8 ml), were added to the vial. This mixture was mixed, and was then transferred to a glass bottle (54.8 mm in height, and 27 mm in diameter) where it was exposed to UV light (intensity of 0.55 mWcm−2, and at a wavelength of 365 nm) for 30 min. After curing, the THF was allowed to evaporate slowly for three days (by covering the glass bottle with a piece of parafilm). The formed copolymer was then contacted with other reference materials.

FIG. 4A compares the charge of the 50-50 wt % copolymer, the 100% PEGDA and the 100% HDFDMA after contact with the respective reference materials. For all the reference materials, the charges of the 50-50 wt % copolymer were between that of the 100% PEGDA and 100% HDFDMA. Similarly, the charges of the reference materials in contact with the 50-50 wt % copolymer were also in between those in contact with 100% PEGDA and 100% HDFDMA (FIG. 4B). It can therefore be seen from the results that it is possible to tune the charge on the polymeric surface generated by contact electrification by copolymerizing varying amounts of PEGDA monomer versus HDFDMA monomer.

Figure 5A:
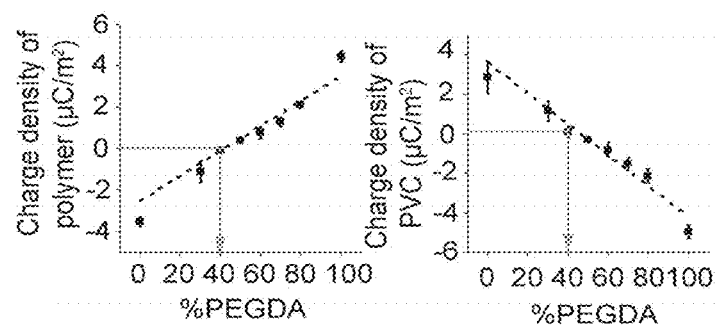
FIGS. 5A-5B are plots showing the charge density of copolymers according to a particular embodiment.
Figure 5B:
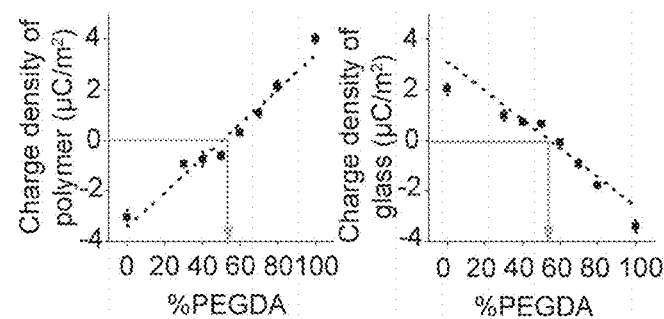

Consequently, it was demonstrated that a non-charging copolymer can be fabricated with an appropriate proportion of PEGDA monomer versus HDFDMA monomer. Specifically, copolymers that were composed of different proportions of PEGDA and HDFDMA were contacted against poly(vinyl chloride) (PVC) as the reference material. Results from the measurements of their charges showed that the charge of the polymers varies approximately linearly with increasing proportion of PEGDA. It was found that at around 40% PEGDA, both the copolymer and PVC did not charge by contact electrification (FIG. 5A). The experiment was repeated for glass as the reference material and found that the trends are qualitatively similar to the case when PVC is the reference material. In this case, both the copolymer and glass did not charge at around 55% PEGDA (FIG. 5B).

Figure 6:
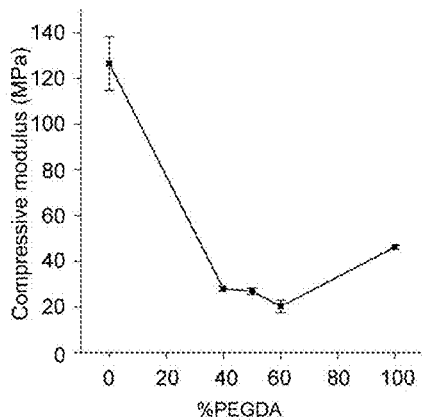
FIG. 6 shows the mechanical strength of the copolymer according to one embodiment with different PEGDA proportions.

Physical Properties of Copolymer Comprising PEGDA and HDFDMA (i) Compressive Moduli The compressive moduli of the copolymer with different amounts of PEGDA was measured using a material testing system (5500, Instron). The results are shown in FIG. 6. The compressive moduli was found to be similar to other types of polymers such as chlorinated polyethylene and low-density polyethylene.

(ii) Surface Roughness

The surface roughness of the PEGDA-HDFDM copolymers was also measured. Different pieces of PEGDA-HDFDMA copolymers of different compositions were prepared. However, all were of the same size (i.e., circular and having a diameter of 2 cm). However, the areas of contact between the copolymers and the reference material may still differ if the surface roughness varies across different pieces of the copolymers of different compositions. The surface roughness of the copolymers of different compositions were measured using a Profilometer. The surface roughness was approximately the same across different compositions of the copolymers. Hence, the areas of contact between the copolymers of different compositions and the reference material were expected to be similar.

When surface roughness is higher, this implies that the contacting surfaces contact with a larger surface area. A larger surface area would mean that there can be more charge separation. Since the surface roughness is determined to be approximately constant, it can be concluded that there is no additional charge effect due to surface area.

(iii) Bulk Conductivities

In addition, the bulk conductivities of the copolymers were also determined by measuring the resistances using an electrometer (model 6514, Keithley). Resistance can be converted to bulk conductivity by the formula, $$\sigma = \frac{L}{(R_B \times A)}$$

where $\sigma$ is the conductivity, L is the length, A is the cross-sectional area, and $R_B$ is the resistance of the polymer as measured by the electrometer.

Figure 7:
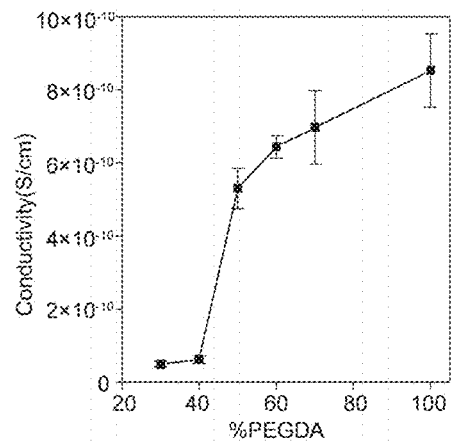
FIG. 7 shows the bulk conductivities of the PEGDA-HDFDMA copolymers.

The bulk conductivities are in the order of $10^{-9}$ S/cm or less for polymers of all proportions of PEGDA (FIG. 7); hence, the polymers are non-conductive. Note that the measurement for the conductivity of the 0% PEGDA is not available because its conductivity was too low for the electrometer to measure.

Non-Charging Characteristic of Copolymer Comprising PEGDA and HDFDMA (A) In order to demonstrate that the copolymer fabricated can resist charging against, and prevent the adhesion of, microscopic particles, dextrose powder (diameter ~100 micron) was brought into contact with polymers composed of different proportions of PEGDA and HDFDMA. The reason for choosing to work with dextrose is because it is important for many purposes, including using it as a pharmaceutical excipient. Specifically, 0.03 g of dextrose powder was transferred onto the surface of the copolymer, and agitated with the copolymer using a vortex mixer (FIG. 8).

As the powder particles rolled across the surface, both the powder and the surface gained charge due to contact electrification. An indication of the attractive electrostatic force is the number of particles that remained adhered onto the surface after it was turned upside down. If the attractive electrostatic force was negligible, the particles fell off the surface due to gravity. For the case when the surface was composed of either 100% PEGDA or 100% HDFDMA, a large portion of the surface was covered with the powder (see FIG. 9A). At 38% PEGDA, only a few particles adhered to the surface—thus, this surface prevents the adhesion of the microscopic dextrose particles.

In order to demonstrate that the adhesion of the powder is mainly due to the attractive electrostatic force and not due to van der Waals force (or other types of forces), two types of control experiments were conducted.

First, 0.03 g of dextrose powder particles were placed onto the surfaces of the polymers of different compositions. Then, the polymers were turned immediately upside down without agitating them (and the particles) on the vortex mixer. It was observed that for all cases—including the 100% PEGDA, 100% HDFDMA and copolymers of other percentages—the powder particles fell off the surfaces almost completely. Since the particles could not stick onto the surface without agitation, van der Waals forces (or other binding forces) are not responsible for the adhesion.

In the second experiment, 0.03 g of dextrose powder was placed onto a 100% HDFDMA surface. The polymer was agitated, together with the particles, using a vortex mixer. After agitation, the polymer was turned upside down, and it was found that many particles adhered onto the surface as expected. Then, the particles were removed from the surface of the polymer by blowing a stream of nitrogen gas onto the surface. The particles were blown onto a Petri dish. After removing the particles, the same surface of the polymer that was originally covered with the particles was brought into contact with the particles on the Petri dish. As expected, the particles adhered onto the surface again.

Subsequently, the above experiment was repeated by agitating the particles on the surface of the 100% HDFDMA, and turned the polymer upside down. Similarly, we removed the particles by blowing a stream of nitrogen gas onto the surface. After blowing, an extra step was conducted in which a Zerostat gun was used to discharge the surface of the polymer and the particles on the Petri dish. After discharge, the polymeric surface was brought into contact with the particles on the Petri dish; however, only few particles adhered onto the surface. Since the particles could not adhere onto the surface when both the particles and the surface were discharged, it was concluded that the adhesion force is due to attractive electrostatic force.

(B) To further demonstrate that the copolymer resists charging, the experiment described above in relation to dextrose powder was repeated with micron-sized glass beads. The results are as shown in FIG. 9B. For most combinations of proportions of PEGDA and HDFDMA, the glass particles stuck firmly onto the materials and refused to fall off even when the materials were turned upside down. However, when the percentage of PEGDA was close to 50%, most of the glass particles fell off. This effect is indicative that the particles were not charged.

Figure 10A:
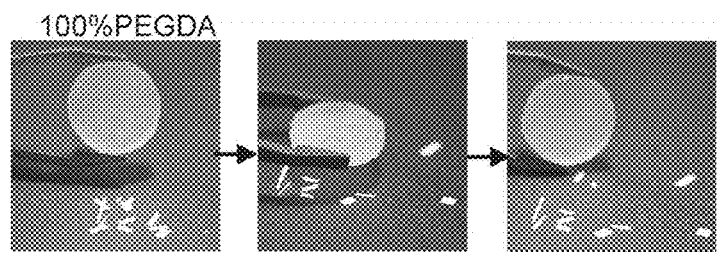
FIGS. 10A-10C show the effects of charging of different polymeric compositions.
Figure 10B:
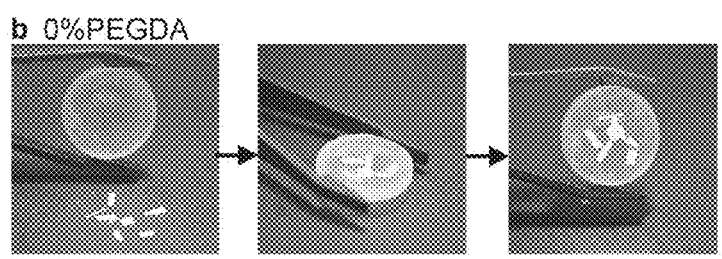
Figure 10C:
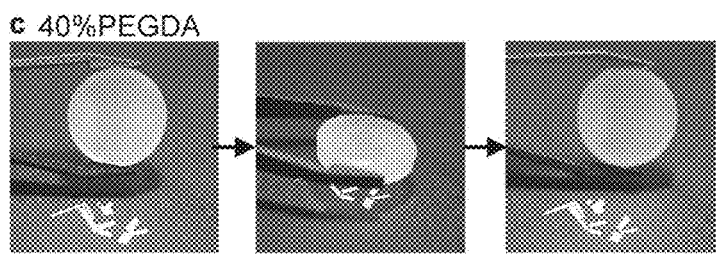

(C) Another experiment was conducted to show the non-charging characteristic of the prepared copolymer. When two pieces of polymeric surfaces are rubbed against each other, they typically gain significantly more charge than when they merely come into contact. However, the fabricated copolymer did not charge significantly even after rubbing with another polymeric surface. First, three types of samples were prepared, the 100% PEGDA, 40% PEGDA, and 0% PEGDA, as previously described. After preparation, these samples and a piece of PVC were first discharged using a Zerostat gun. Subsequently, the samples were rubbed against the piece of PVC for 40 seconds using a force of ~3 N (or an equivalent pressure of ~8 kPa, as measured by using the same amount of force on a mass balance). After rubbing, the charges of the 100% PEGDA, 40% PEGDA, and 0% PEGDA were measured to be 7.4 $\mu C/m^2$, −0.6 $\mu C/m^2$, and −11.2 µC/m², respectively. In a separate step, 10 pieces of paper were cut from a fresh piece of A4-sized copy paper. After cutting, each piece of paper had a weight of 1.2 mg, and an average residual charge of ~0.2 µC/m². The samples were then brought to a distance of ~1.5 mm away from the pieces of paper. FIG. 10A shows that the positively-charged surface of the 100% PEGDA repelled the positively-charged pieces of paper away from the surface. For the negatively-charged 0% PEGDA, the positively-charged pieces of paper were attracted to, and stuck onto, the surface (FIG. 10B). However, for the 40% PEGDA, it had no observable effect on the paper (FIG. 10C). This demonstrated that the 40% PEGDA did not charge significantly even after rubbing against PVC.

Example 2

Fabrication and Characterization of PVAc-PAN Copolymer

Another copolymer was prepared using vinyl acetate as the first polymer and acrylonitrile as the second polymer. The reason for choosing these two monomers is because poly(vinyl acetate) (PVAc) and polyacrylonitrile (PAN) are reasonably far apart in the triboelectric series (FIG. 1).

A 50-50 wt % copolymer was polymerized by free radical polymerization of the monomers acrylonitrile and vinyl acetate. Specifically, 3 g of acrylonitrile and 3 g of vinyl acetate was dissolved in 25 ml of distilled water, and the solution was stirred for 20 minutes. Subsequently, 0.342 g of APS in 5 ml distilled water was added to the solution. Copolymerization was carried out in a flat-bottomed flask equipped with a condenser. The solution was maintained at 70° C. and was constantly stirred for three hours. After the copolymerization, the precipitated polymer was washed with dilute nitric acid, distilled water, and ethanol. The polymer was then filtered and dried at room temperature for two days. The polymeric powder was compressed into a cylindrical solid (5 mm radius, 6.5 mm thick) using a tablet machine (SSP-10A, Shimadzu). The process of fabricating the 100% polyacrylonitrile and 100% poly(vinyl acetate) is similar to the procedure described above except for the amounts of the monomers used.

Figure 11A:
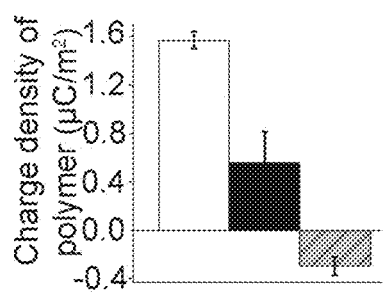
FIGS. 11A-11B are plots showing charge density.
Figure 11B:
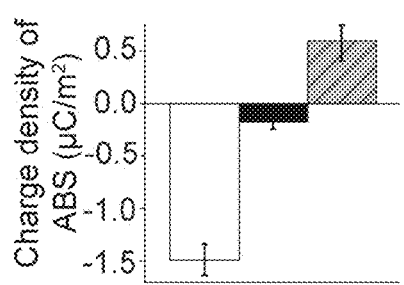

After contacting the copolymer with acrylonitrile butadiene styrene (ABS), it was found that the results are qualitatively similar to those obtained from the copolymers fabricated from PEGDA and HDFDM. First, the 100% PVAc charged positively, while the 100% PAN charged negatively against ABS (FIG. 11A-11B). This result is in accordance to their ranking in the triboelectric series since PVAc is ranked above ABS and PAN is ranked below ABS (see FIG. 1). The charge of the 50-50 wt % PVAc-PAN copolymer is in between that of the 100% PVAc and 100% PAN (FIG. 11A); the charge of ABS in contact with the 50-50 wt % PVAc-PAN copolymer is also in between the charge of ABS in contact with 100% PVAc and 100% PAN (FIG. 11B). This shows that it is possible to fabricate copolymers that resist charging against other materials with appropriate proportions of PVAc versus PAN (except when the reference material is not in between PVAc and PAN in the triboelectric series. As an example, a 100% PVAc polymer, a 100% PAN polymer, and a 50%-50% PVAc-PAN copolymer was contacted with PTFE. PTFE is ranked lower than both PVAc and PAN in the triboelectric series. Results showed that all the three polymers charged positively against PTFE, while PTFE charged negatively for all the three polymers. Hence, the PVAc-PAN copolymer can never be non-charging against PTFE.

The conductivity of the copolymers was also measured. For 100% PVAc, the bulk conductivity was $3.5 \times 10^{-12}$ S/cm, for 100% PAN, it was $6.6 \times 10^{-11}$ S/cm, and for 50-50 wt % PVAc-PAN, it was $4.7 \times 10^{-11}$ S/cm. These results show that the copolymers are insulators. The surface resistivities corresponding to these bulk conductivities were $2.4 \times 10^{11}$ Ω/sq for the 100% PVAc, $2.5 \times 10^{10}$ Ω/sq for the 50-50 wt % PVAc-PAN, and $1.9 \times 10^{10}$ Ω/sq for the 100% PAN. These low surface resistivities mean that the copolymers do not dissipate charge readily away from their surfaces. The compressive modulus of the 50-50 wt % PVAc-PAN copolymer was measured to be ~2 GPa.

Example 3

Fabrication and Characterization of Composite Polymer Material

Two different composite polymer materials were formed by physically mixing different polymers. One composite polymer material comprised polytetrafluoroethylene (PTFE) particles dispersed in a matrix of polyamide (PA) and a second composite polymer material comprised PTFE particles dispersed in a matrix of PEGDA. The general scheme followed is shown in FIG. 12.

PTFE Particles Dispersed in PA Matrix 2 g of polyamide pellets (Sigma-Aldrich) with 8 ml of formic acid (Sigma-Aldrich). The mixture was then heated to 60° C. overnight in order to dissolve the PA pellets in the formic acid. After dissolution, an appropriate amount varying from 0-43% of PTFE particles (Sigma-Aldrich) was added into the solution; this mixture was mixed thoroughly by a vortex mixer. Finally, the mixture was heated to 80° C. overnight in order to evaporate the formic acid completely. Thus, the resulting material consisted of PTFE particles dispersed in the PA matrix.

PTFE Particles Dispersed in a Matrix of PEGDA 1 g of PEGDA (Sigma-Aldrich), 0.01 g of an initiator (1-hydroxycyclohexyl phenyl ketone) (Sigma-Aldrich), and an appropriate amount varying from 0-50% of PTFE particles (Sigma-Aldrich) were mixed to form a mixture. The mixture was then exposed to UV light (intensity of 0.55 mW/cm², at a wavelength of 365 nm) for 15 minutes. The resulting composite material consisted of PTFE particles dispersed in the PEGDA matrix.

Non-Charging Characteristic of Composite Polymer Material

Figure 13A:
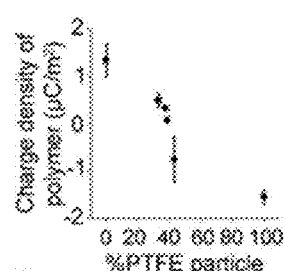
FIGS. 13A-13D show plots of the charge density of composite polymer materials according to a particular embodiment when contacted with PVC.
Figure 13B:
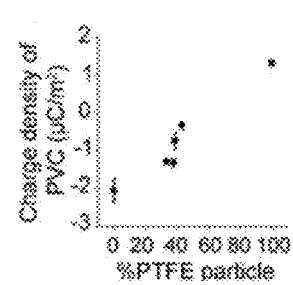

FIGS. 13A-13D show the non-charging characteristic of composite polymer materials (i) and (ii) above. First, composite polymer material (i) was contacted with a reference material, polyvinyl chloride (PVC). After discharging the composite polymer material (i) and the reference material, the materials were brought into contact for about 20 times. FIG. 13A shows the dependence of charge of the composite polymer material (i) with the proportion of the PTFE particles added; FIG. 13B shows the dependence of charge of the reference material, PVC, with the proportion of the PTFE particles added. The surface becomes non-charging at around 40 weight % of PTFE particles added.

Figure 13C:
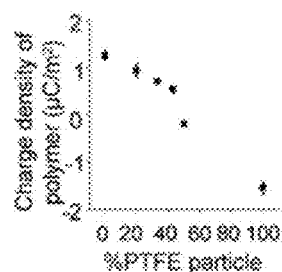
Figure 13D:
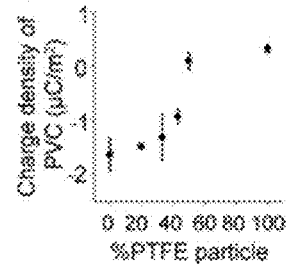

Similarly, FIGS. 13C and 13D show the case in which composite polymer (ii) was used. The experiment as described above and it was found that the surface became non-charging at around 50 weight % of PTFE particles added.

What is claimed is:

1. A polymer material comprising at least a first polymer or a first monomer of the first polymer and a second polymer or a second monomer of the second polymer, wherein the first polymer has a first rating on a triboelectric series and the second polymer has a second rating on a triboelectric series that is more negative than the first rating, and wherein the polymer material is triboelectrically neutral such that it resists charging when contacted with a material distinct from the polymer material.

2. The polymer material according to claim 1, wherein the polymer material is a copolymer.

3. The polymer material according to claim 1, wherein the polymer material is homogeneous.

4. The polymer material according to claim 1, wherein the polymer material is a composite of the first polymer and the second polymer.

5. The polymer material according to claim 1, wherein the first polymer and the second polymer are non-conductive polymers.

6. The polymer material according to claim 1, wherein the first monomer comprises polyethylene glycol diacrylate (PEGDA) or the first polymer is selected from the group comprising: polymerized polyethylene glycol diacrylate (PEGDA), polyvinyl acetate (PVAc), polyamide and polymethyl methacrylate.

7. The polymer material according to claim 1, wherein the second monomer is 3,3,4,4,5,5,6,6,7,7,8,8,9,9,10,10,10-Heptadecafluorodecyl methacrylate (HDFDMA) or the second polymer is selected from the group comprising: polymerized 3,3,4,4,5,5,6,6,7,7,8,8,9,9,10,10,10-Heptadecafluorodecyl methacrylate (HDFDMA), polyacrylonitrile (PAN), polyethylene and polyvinyl chloride.

8. The polymer material according to claim 1, wherein the first monomer is polyethylene glycol diacrylate (PEGDA) or the first polymer is polymerized polyethylene glycol diacrylate (PEGDA) and the second monomer is 3,3,4,4,5,5,6,6,7,7,8,8,9,9,10,10,10-Heptadecafluorodecyl methacrylate (HDFDMA) or the second polymer is polymerized 3,3,4,4,5,5,6,6,7,7,8,8,9,9,10,10,10-Heptadecafluorodecyl methacrylate (HDFDMA).

9. The polymer material according to claim 8, wherein the polymer material comprises 50% polymerized PEGDA and 50% polymerized HDFDMA or 50% PEGDA monomer and 50% HDFDMA monomer.

10. A method of preparing a polymer material comprising the steps of mixing at least a first pre-determined amount of a first polymer or a first monomer of the first polymer and a second pre-determined amount of a second polymer a second monomer of the second polymer, the first polymer having a first rating on a triboelectric series and the second polymer having a second rating on a triboelectric series that is more negative than the first rating, wherein the first pre-determined amount and the second pre-determined amount are such that the polymer material resists charging when contacted with a material distinct from the polymer material.

11. The method according to claim 10, wherein the mixing comprises co-polymerizing the first monomer of the first polymer and the second monomer of the second polymer.

12. The method according to claim 11, wherein the co-polymerizing is by free radical polymerization.

13. The method according to claim 10, wherein the polymer material is homogeneous.

14. The method according to claim 10, wherein the mixing comprises physically mixing the first polymer and the second polymer.

15. The method according to claim 14, wherein the polymer material is a composite of the first polymer and the second polymer.

16. The method according to claim 10, wherein the first polymer and the second polymer are non-conductive polymers.

17. The method according to claim 10, wherein the first monomer comprises polyethylene glycol diacrylate (PEGDA) or the first polymer is selected from the group comprising: polymerized polyethylene glycol diacrylate (PEGDA), polyvinyl acetate (PVAc), polyamide and polymethyl methacrylate.

18. The method according to claim 10, wherein the second monomer comprises 3,3,4,4,5,5,6,6,7,7,8,8,9,9,10,10,10-Heptadecafluorodecyl methacrylate (HDFDMA) or the second polymer is selected from the group comprising: polymerized 3,3,4,4,5,5,6,6,7,7,8,8,9,9,10,10,10-Heptadecafluorodecyl methacrylate (HDFDMA), polyacrylonitrile (PAN), polyethylene and polyvinyl chloride.

19. The method according to claim 10, wherein the first monomer is polyethylene glycol diacrylate (PEGDA) or the first polymer is polymerized polyethylene glycol diacrylate (PEGDA) and the second monomer is 3,3,4,4,5,5,6,6,7,7,8,8,9,9,10,10,10-Heptadecafluorodecyl methacrylate (HDFDMA) or the second polymer is polymerized 3,3,4,4,5,5,6,6,7,7,8,8,9,9,10,10,10-Heptadecafluorodecyl methacrylate (HDFDMA).

20. A method of preparing a copolymer comprising the steps of co-polymerizing at least a first pre-determined amount of a first polymer and a second pre-determined amount of a second polymer, the first polymer having a first rating on a triboelectric series and the second polymer having a second rating on a triboelectric series that is more negative than the first rating, wherein the first pre-determined amount and the second pre-determined amount are such that the copolymer resists charging when contacted with a material.

* * * * *